United States Patent [19]
Canteloup et al.

[11] Patent Number: 5,355,217
[45] Date of Patent: Oct. 11, 1994

[54] ASSEMBLY FOR SIMULTANEOUS OBSERVATION AND LASER INTERFEROMETRIC MEASUREMENTS, IN PARTICULAR ON THIN-FILM STRUCTURES

[75] Inventors: Jean Canteloup, Monthlery; Jacky Mathias, Jargeau, both of France

[73] Assignee: Sofie, Arpajon, France

[21] Appl. No.: 930,243

[22] Filed: Aug. 14, 1992

[30] Foreign Application Priority Data

Aug. 14, 1991 [FR] France .................. 91 10355

[51] Int. Cl.$^5$ .................................................. G01B 9/02
[52] U.S. Cl. ................................. 356/357; 356/345
[58] Field of Search ............... 356/345, 355, 357, 358, 356/349; 156/626

[56] References Cited

U.S. PATENT DOCUMENTS

| | | | |
|---|---|---|---|
| 4,358,201 | 11/1982 | Makosch | 356/357 |
| 4,443,106 | 4/1984 | Yasuda | |
| 4,479,848 | 10/1984 | Otsubo et al. | 156/626 |
| 4,770,532 | 9/1988 | Ito | |
| 4,984,894 | 1/1991 | Kondo | 356/355 |

FOREIGN PATENT DOCUMENTS

| | | |
|---|---|---|
| 0248479 | 12/1987 | European Pat. Off. |
| 0350869 | 1/1990 | European Pat. Off. |
| 2851750 | 3/1980 | Fed. Rep. of Germany |
| 59-60203 | 4/1984 | Japan |
| 8303303 | 9/1983 | World Int. Prop. O. |

*Primary Examiner*—Samuel A. Turner
*Assistant Examiner*—Robert Kim
*Attorney, Agent, or Firm*—Helfgott & Karas

[57] ABSTRACT

Assembly for observation and laser interferometric measurements of articles contained in an enclosure includes a video camera and a laser emitter unit. The laser emitter unit has two laser diodes whose beams follow the optical path of the video camera. An illumination system also follows the optical path of the video camera. The entire assembly is incorporated into a single box. The assembly is utilized for the observation and measurement of thin-film structures, in particular integrated-circuit boards.

9 Claims, 3 Drawing Sheets

ASSEMBLY FOR SIMULTANEOUS OBSERVATION AND LASER INTERFEROMETRIC MEASUREMENTS, IN PARTICULAR ON THIN-FILM STRUCTURES

BACKGROUND OF THE INVENTION

The present invention relates to an assembly for observation and for laser interferometric measurements, in particular of thin-film structures, for example semiconductor structures such as integrated circuits.

A plasma-etch control system, intended more particularly for integrated-circuit board diagnostics, in which the etching operations on the thin films are controlled by means of an interferometric detection system using the beam of a laser tube, is known. A video camera moreover enables the position of the spot produced by the laser beam on the integrated-circuit board to be adjusted and monitored.

The main drawback of this known system consists in that the laser tube and the video camera are separate, which renders the assembly bulky and difficult to house in a plasma-etch apparatus and especially in an apparatus for producing integrated circuits, above which the space available is very restricted. In addition, this known system uses a single laser, which is insufficient for some applications.

SUMMARY OF THE INVENTION

It is an object of the present invention to provide an assembly permitting simultaneously observation and laser interferometric measurements, which is more compact than the aforementioned known system and which can therefore also be used when the space available in the devices is very restricted. The object of the invention moreover is to provide an assembly for observation and for laser interferometric measurements which can use several laser sources, either of different wavelengths or of the same wavelength, it being possible for these sources to be used simultaneously or alternately.

In accordance with the present invention, the assembly for observation and for laser interferometric measurements, which is usable especially for thin-film structures, comprises a video camera and at least one laser emitter. According to the invention, the laser emitter comprises a laser diode combined with the camera so that its beam follows the optical path of the camera.

The system for illuminating the zone observed by the camera is preferably also combined with the camera and also follows the optical path of the latter.

On account of the small size of laser diodes, the assembly in accordance with the invention can comprise several laser diodes combined with the camera.

To prevent blinding the sensor of the camera by the beam or beams of the laser diode or diodes, the camera advantageously includes a filter in front of its sensor.

Commercial laser diodes can have very different powers depending on the wavelengths which they emit. This is the reason for which, moreover, there is provision, according to the invention for placing a polarizer in front of the sensor of the camera and for mounting the laser diodes so that they are adjustable in their angular position about their emission axes. In fact, given that the laser diodes emit polarized light, their angular adjustment, due to the presence of the polarizer, enables the different powers arriving on the sensor of the camera to be balanced simply, without blinding the latter.

The camera with the incorporated laser diode or diodes is advantageously mounted on an X-Y traversing table controlled by stepper motors.

The laser diodes used in the assembly in accordance with the invention may have identical or different wavelengths. In both cases they can work either alternately (sequential mode), or simultaneously by modulation-demodulation, at different frequencies.

The optical paths followed by the beams of the laser diodes may be identical (analysis at any one point of the specimen). This configuration will be especially advantageous in the case of different wavelengths. In this case, the transport of the laser beams may be performed by way of optical fibers with addition of a wavelength multiplexer (dispersive system).

Accessible adjustment outside the instrument enables one of the laser diodes to be moved with respect to the other, so that the analyzed points on the surface are spatially offset. This configuration is advantageous in both cases, identical or different wavelengths.

In all these configurations, the measurement of the light intensities of the return beams is performed by a photosensitive sensor or by the camera itself.

Referring to the attached diagrammatic drawings, an illustrative and non-limiting embodiment of an assembly in accordance with the invention will be described in more detail hereinafter.

DETAILED DESCRIPTION OF THE PREFERRED EMBODIMENTS

Figure 1:
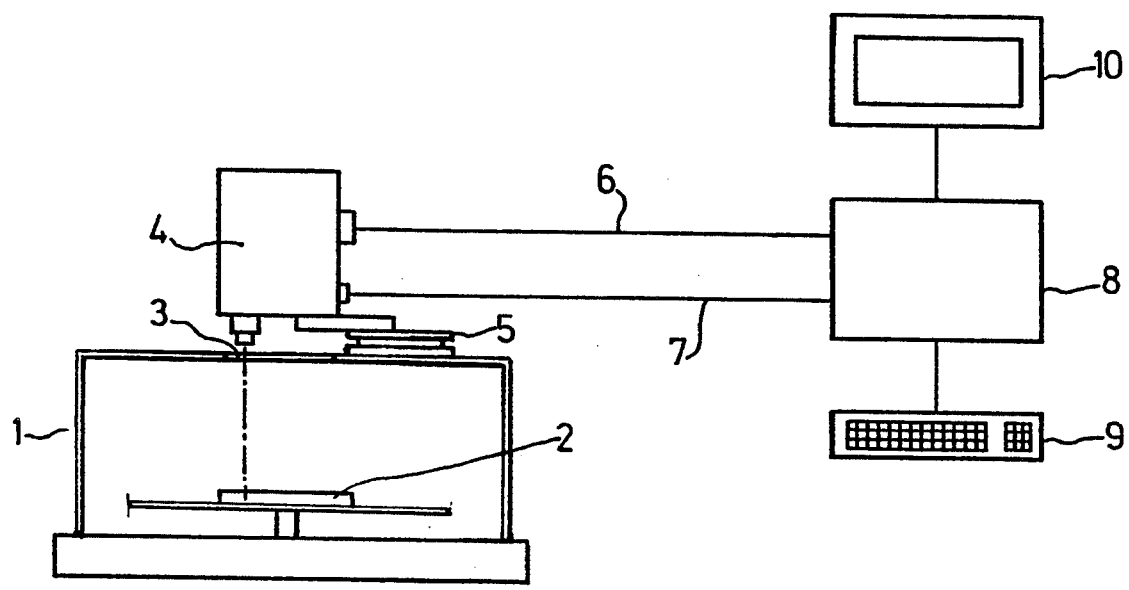
FIG. 1 represents the diagram of an assembly in accordance with the invention showing a treatment chamber with the associated display and control means.

According to FIG. 1, a closed treatment chamber 1, in which a specimen 2 to be treated is arranged, for example an integrated-circuit board in the process of manufacture or of etching, includes in its upper wall a window 3 made from silica. An observation and measurement unit 4 is mounted on top of the chamber 1 by way of an X-Y traversing table 5. The unit 4 is connected via an optical fiber 6 or via a cable 7 to an operation (interferometry) and control unit 8 with which are combined, on the one hand, a keyboard 9 and, on the other hand, a display screen 10.

Figure 2:
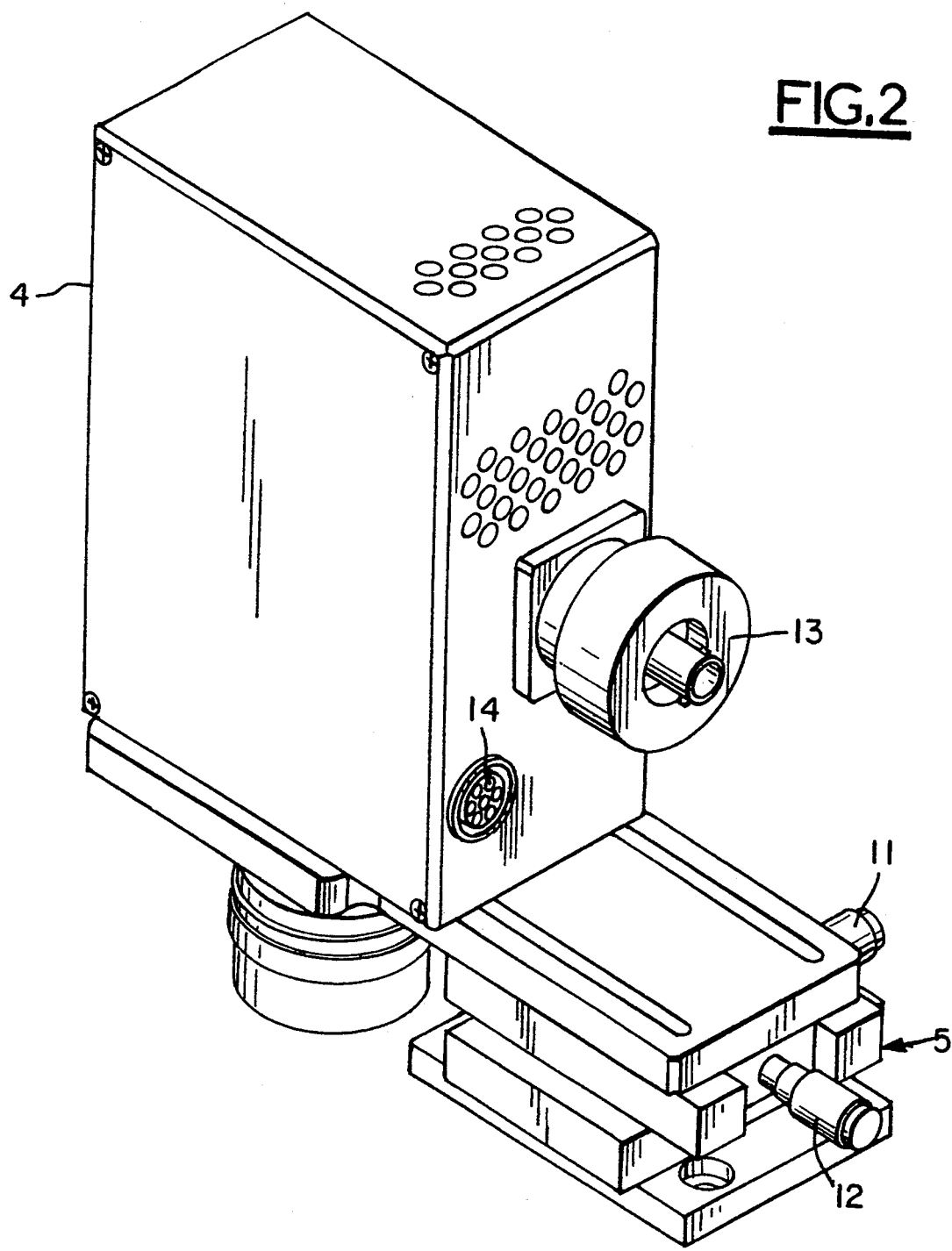
FIG. 2 is a perspective view, on a larger scale, of the assembly mounted on an X-Y traversing table.

In FIG. 2 the observation and measurement unit 4 with its X-Y traversing table 5 is found again, in which the two control motors 11 and 12, preferably electric stepper motors, may be identified.

A connector 13 for the optical fiber 6, as well as a connector 14 for the cable 7, may also be identified in FIG. 2.

Figure 3:
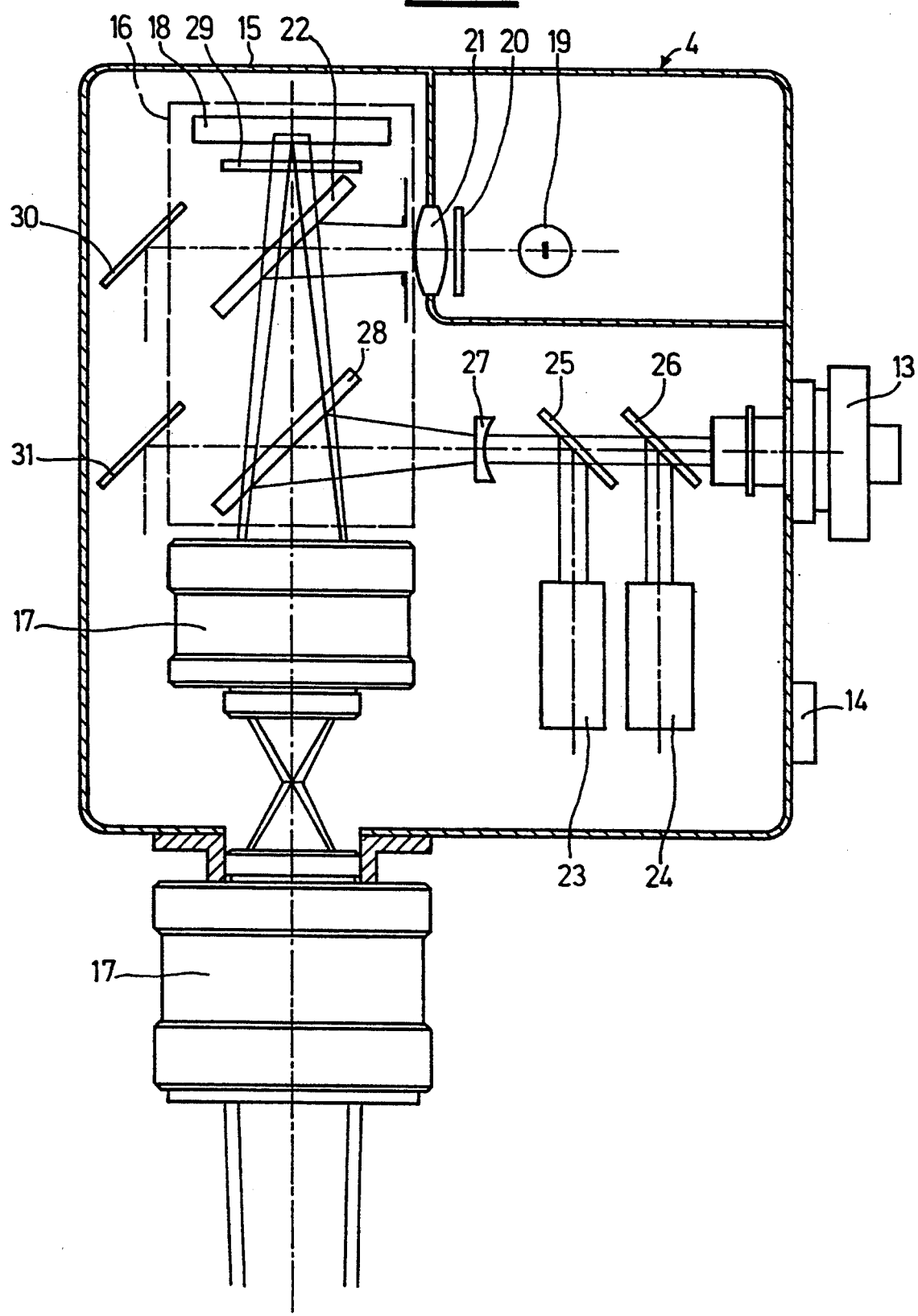
FIG. 3 is a diagrammatic cross-section of the assembly of FIG. 2.

As FIG. 3 illustrates, the unit 4 contains, in a box 15, a video camera 16 whose adjustable objective 17 may preferably be an objective of the autofocussing type. The camera 16 comprises, in a manner known per se, a sensor 18 of the type formed from a matrix of cells, in particular from charge-transfer cells (CCD).

The sensor 18 is connected, in a manner not represented, to the connector 14 for the cable 7.

Furthermore, inside the box 15, there is a source of illumination 19 whose light is projected, through a filter 20 and a lens 21, onto a semi-transparent mirror 22 inserted in the optical path between the objective 17 and the sensor 18 of the camera in such a way that it follows the optical path of the camera.

The box 15 encloses, moreover, two laser diodes 23 and 24 whose beams are projected, by two semi-reflecting mirrors 25 and 26 and a lens 27, onto another semi-reflecting mirror 28 inserted in the optical path between the objective 17 and the sensor 18 of the camera 16, so that the laser beams also follow the optical path of the camera 16.

As a consequence the unit 4 contains, in the same small-volume box 15, the camera 16 with its illumination system 19 in order to observe, on the display unit 10 of FIG. 1, a predetermined zone of the specimen 2, as well as two laser units 23, 24 in order for each to project a laser beam onto a point of the observed zone, the laser beam, reflected by the specimen 2 and transmitted for example with wavelength multiplexing via the optical fiber 6 to the control unit 8, being detected and treated here with a view to its interferometric operation, known per se, the result of this operation also being displayed on the display unit 10.

The two diodes 23, 24 can emit either at the same wavelength or at different wavelengths. In the case of two diodes emitting at different wavelengths, the power differences of the two diodes could cause blinding of the sensor 18 of the camera 16. This is why, in order to equalize the laser powers received by the sensor 18 from the two diodes which emit the polarized light, the sensor 18 is preceded by a polarizer 29. Thus, by adjusting the angular position of each of the two diodes 23, 24 about its emission axis, it is possible to ensure, by virtue of the polarizer 29, that the sensor 18 receives the same power from each of the two diodes 23, 24 so that the image detected by the camera 16 and reproduced on the display unit 10 is not disturbed by the spots produced by the laser beams on the observed zone and therefore visible in the image reproduced on the display unit 10.

The two laser diodes 23, 24 may, moreover, serve not only for interferometric measurements, for example for determining thicknesses of layers of the specimen 2, the rate of increase (deposition) or decrease (etching) of layers, the depth of holes etc., but also, for example, for studying defects, for checking reproducibility, for studying contours, possibly for recognizing shapes, as well as for automatic positioning of the unit 4 by means of the X-Y traversing table 5.

Of course, the embodiment illustrated and described has only been given by way of indicative and non-limiting example and numerous modifications and variants are possible within the scope of the invention.

In particular, it would be possible, depending on the case, to equip the unit 4 either only with a single diode or, optionally, with more than two diodes. In the case of use of at least two diodes (regardless of their wavelength), the latter may work either alternately or simultaneously by modulation-demodulation at different frequencies.

Instead of ensuring, as represented, that the beams of two laser diodes are aligned and therefore produce spots at the same location, it would also be possible to misalign the two diodes so that the beams from the two diodes fall onto two different points on the specimen 2.

The measurement of the light intensities of the return beams of laser diodes 23, 24 may be performed by a photosensitive sensor to which these return beams are transported via optical fibers 6 with addition of a wavelength multiplexer.

Furthermore, it is possible to provide, behind each of the semi-reflecting mirrors 22, 25, 26, 28, a light trap known per se, such as represented diagrammatically at 30 and 31 behind the mirrors 22 and 28.

The camera, whose sensitive surface is composed of elementary silicon diodes, furthermore makes it possible to use non-visible wavelengths (near infrared) which are advantageous in checking some materials.

We claim:

1. An assembly for observation and laser interferometric measurements of articles, such as thin film structures, contained in a closed treatment chamber through a window in said treatment chamber, the assembly comprising:

an observation and measurement unit including a box-shaped housing located outside said treatment chamber at said window thereof, a video camera provided with an objective, means for illuminating a zone on the articles being treated so as to be observed by the video camera, and at least one laser emitter providing a laser beam on said zone to be observed; said video camera, said means for illuminating and said at least one laser emitter being enclosed within said housing and being arranged so as to provide a common optical path including a path of a return beam of said at least one laser emitter, said common path having an optical axis which passes through said objective of the video camera and through said window of the treatment chamber so that the articles in the treatment chamber can be simultaneously observed and subjected to measurements;

sensor means for measuring light intensity of the return beam of said at least one laser emitter; and an interferometric measurement control and display system optically connected to said observation and measurement unit by optical fiber means, said sensor means including one of a sensor provided inside said video camera and a photosensitive sensor provided such that said return beam is transported thereto from said unit via said optical fiber means.

2. Assembly according to claim 1, wherein a plurality of said laser emitters are provided in said housing, which are laser diodes combined with the camera.

3. Assembly according to claim 1, wherein said sensor means includes said sensor inside said video camera which further includes, in front of said sensor, a filter preventing blinding of the sensor by the beam of the laser emitter.

4. Assembly according to claim 3, wherein said video camera includes a polarizer in front of said sensor and said at least one laser emitter is rotationally adjustable about an emission axis thereof.

5. Assembly according to claim 1, wherein said unit is mounted on an X-Y traversing table controlled by stepper motors.

6. Assembly according to claim 2, wherein the laser diodes emit beams at the same wavelength.

7. Assembly according to claim 2, wherein the laser diodes emit beams at different wavelengths.

8. Assembly according to claim 2, wherein the sensor means includes said sensor in said video camera for measurement of light intensities of return beams of the laser diodes.

9. Assembly according to claim 2, wherein the sensor means includes said photosensitive sensor for measurement of light intensities of return beams of the laser diodes and wherein the return beams are transported via said optical fiber means with addition of a wavelength multiplexer.

* * * * *